March 16, 1926. 1,576,511
W. C. HUEBNER
PHOTOGRAPHIC PRINTING APPARATUS
Original Filed Feb. 27, 1919  3 Sheets-Sheet 1
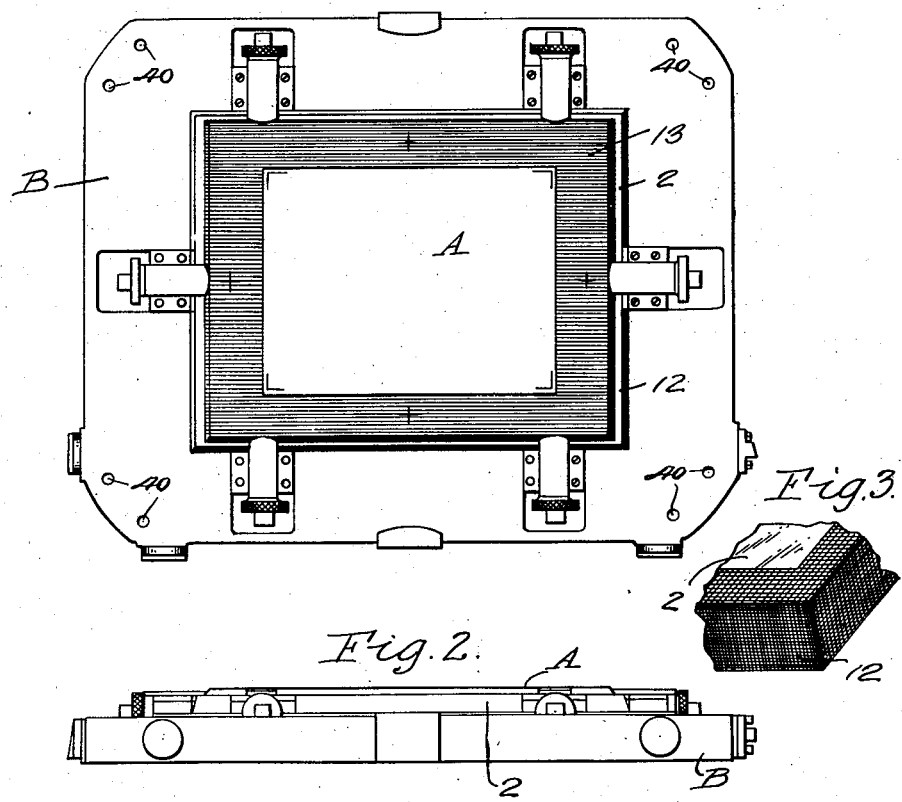
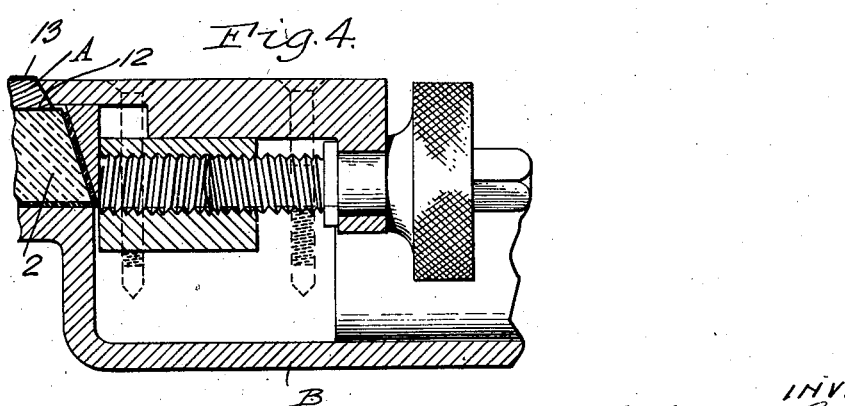
INVENTOR
William C. Huebner
by Parker & Brockwood
ATTORNEYS.

March 16, 1926.

W. C. HUEBNER

PHOTOGRAPHIC PRINTING APPARATUS 1,576,511

Original Filed Feb. 27, 1919   3 Sheets-Sheet 3

INVENTOR
William C. Huebner
by Parker & Prochnow
ATTORNEYS

Patented Mar. 16, 1926.

1,576,511

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

PHOTOGRAPHIC-PRINTING APPARATUS.

Original application filed February 27, 1919, Serial No. 279,493. Divided and this application filed March 20, 1922. Serial No. 545,074.

*To all whom it may concern:*

Be it known that I, WILLIAM C. HUEBNER, a citizen of the United States, residing at Buffalo, in the county of Erie and State of New York, have invented a new and useful Improvement in Photographic - Printing Apparatus, of which the following is a specification.

This invention relates to holders for the negatives or transparent printing plates used in photographic contact printing or projection composing apparatus and other apparatus used in connection with photographic plate production and more particularly to means for masking such negatives and for preventing the leakage of light through the border portions thereof. Such photographic printing apparatus are intended for photographing any desired number of like or different prints in any required predetermined and registered position and relative arrangement upon the sensitized surfaces of metal press plates or glass plates which are afterwards suitably finished and used in mechanical printing presses or photographic apparatus for printing in one or more colors.

This application is a division of my application for United States Patent No. 1,413,406 of April 18, 1922.

Heretofore it has been customary to place masks of various material over the edges of the transparent printing plate and the glass supporting plate to prevent the leakage of light to the sensitized surface. But the use of such masks is objectionable because of the time required to place them in position and the delay in the output of the photographic printing apparatus. Such masks, furthermore, are easily displaced and often result in spoiling the prints during exposure because a displaced mask allows light action in the wrong place on the sensitized surface. The masks also prevent close contact between glass or rigid printing and print receiving plates, leaving a space between the plates so that light can leak around the various printing units, which results in very inferior work, or spoiling the plates.

The objects of this invention are to provide means which will prevent the leakage of light through the border portions of the transparent printing plate and will avoid the above mentioned inconveniences and trouble incident to the use of masks; also to provide desirable means for masking or covering a portion of the printing plate so as to enable a print to be made from a portion only of the plate, or from one or more of a plurality of images on the plate and at the same time ensure proper contact between the printing and print-receiving surfaces; also to provide the holder with means for retaining a flexible transparent printing plate or film thereon and means for masking a portion of such flexible printing plate or film so as to enable a print to be made from a portion only of such flexible printing plate on a glass or rigid print-receiving plate and to ensure perfect contact between all portions of the printing and print-receiving surfaces.

In the accompanying drawings:

Fig. 1 is a plan or face view of a printing plate holder embodying the invention and showing a printing plate in position thereon.

Fig. 2 is an edge elevation of the holder.

Fig. 3 is a perspective view of one corner of the transparent supporting plate for the printing plate.

Fig. 4 is an enlarged section showing one of the securing devices for the printing and supporting plates.

Figure 5:
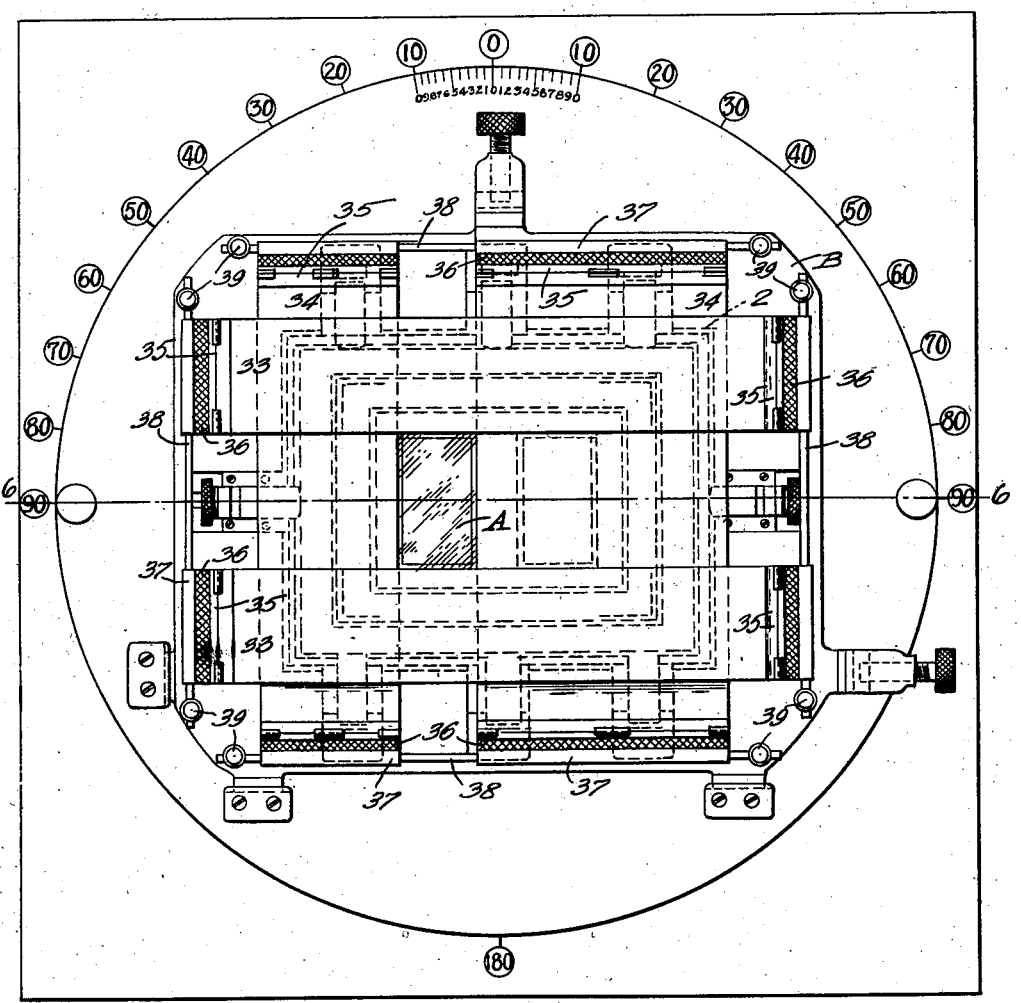
Fig. 5 is a plan or face view showing modified securing means for the printing plate holder and also showing means for masking a portion of the printing plate.

A represents the transparent negative or printing plate and B the holder therefor.

The holder preferably consists of a metal plate provided with a central opening 1 opposite which the printing plate is arranged so as to be illuminated by light passing through the opening. 2 indicates a strong glass or rigid, transparent supporting plate which is secured on the holder over or bridging the opening 1 therein and supports the printing plate. The printing plate and supporting plate are secured on the holder B by securing devices of any suitable sort and which are arranged at a plurality of points around the printing and supporting plates and are adapted to engage the same. The plate holder and securing devices are preferably constructed and arranged so that the outer faces of the clamping blocks, the operating screws therefor, and all other parts of the holder are located well below or back from the plane of the outer face of the printing plate, so that a press plate or print-receiving surface can be placed against and contact with the outer face of the printing plate throughout the extent thereof and project beyond the edges of the printing plate without coming in contact with the securing devices or other parts of the holder. The latter cannot therefore interfere with the complete and perfect contact of the printing plate with a print-receiving surface which may project beyond the edges of the printing plate.

The opposite faces and the edges of the marginal portions of the supporting plate 2 are covered with a thin, opaque coating or paint 12 of any suitable sort adapted to prevent the passage of light through the coated portions of the plate, and the marginal portions of the negative or transparent printing plate A are similarly covered with a thin, opaque paint or coating 13. The opaque border 12 of the supporting plate extends inwardly from the edges of the plate to or beyond the edges of the negative and the opaque border 13 of the negative extends to the margin of the picture or subject on the printing plate. In this way, light is effectually prevented from leaking through the edges or marginal portions of the surfaces of the printing and supporting plates. The opaque coatings are thin enough not to prevent the proper contact of the printing plate against the supporting plate and against the press plate or print-receiving surface. These border coatings take the place of and serve the function of the strips of material or masks which have heretofore been used and are much more desirable in that they eliminate the inconvenience and trouble incident to placing and securing the mask strips in place, they cannot be displaced and they also insure a better contact of the printing plate with the supporting plate and print-receiving surface. They also cover the edges of the plates which are not properly covered by the separate-piece masks or strips.

Figure 6:
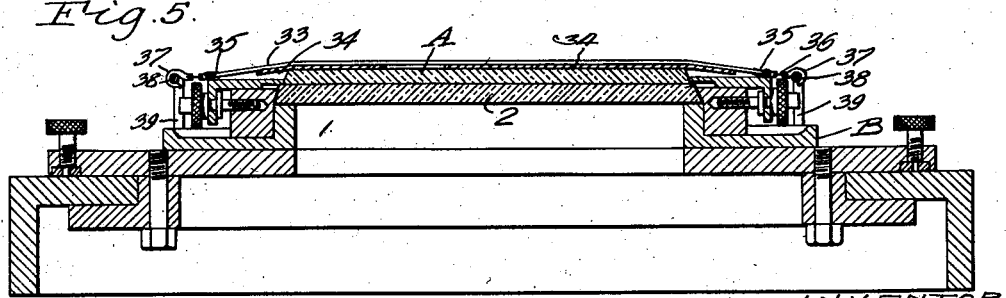
Fig. 6 is a sectional elevation thereof on line 6—6, Fig. 5.
Figure 7:
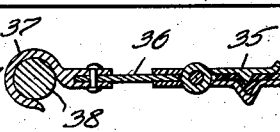
Fig. 7 is a sectional view of one of the attaching devices for the masks.

33 and 34, Figs. 5 and 6, indicate thin masks or covering strips of paper, or other suitable thin, opaque material, which are adapted to be placed crosswise of each other over the face of the printing plate and thus cover a greater or less portion of the face of the plate, depending upon the width of the mask strips. Each of these mask strips is preferably held at its opposite ends in spring or other clips 35, of any suitable construction, which are connected by suitable elastic webs 36 to hooks or fastening devices 37 adapted to be engaged with rods 38 attached to the printing plate holder beyond the edges of the printing plate. These attaching rods 38 can be secured to the plate holder, preferably detachably, by any suitable means, such as short posts 39 through which the rods extend and which are removably retained by friction in holes 40 in the corners of the plate holder. This construction enables the mask strips and their attaching devices to be readily placed in position on the plate holder over the printing plate when they are desired for use and to be removed when they are not needed. The masks are made of material which is thin enough not to prevent a proper contact of the exposed portion of the printing plate with a flexible, metal print-receiving plate. It should be understood that this print-receiving plate is pressed against the transparent printing plate by a suitable pressure device (not shown), located at the rear side of the print-receiving plate opposite the portion of the printing plate which is left uncovered by the masks. As shown by Fig. 6, the attaching devices for the masks, as well as all other parts of the plate holder and its supports, are located below or back from the plane of the outer face of the print plate so as not to prevent the proper contact of the printing plate with a print-receiving surface which may project beyond the edges of the printing plate over the attaching devices or other parts of the holder or supports.

Figure 8:
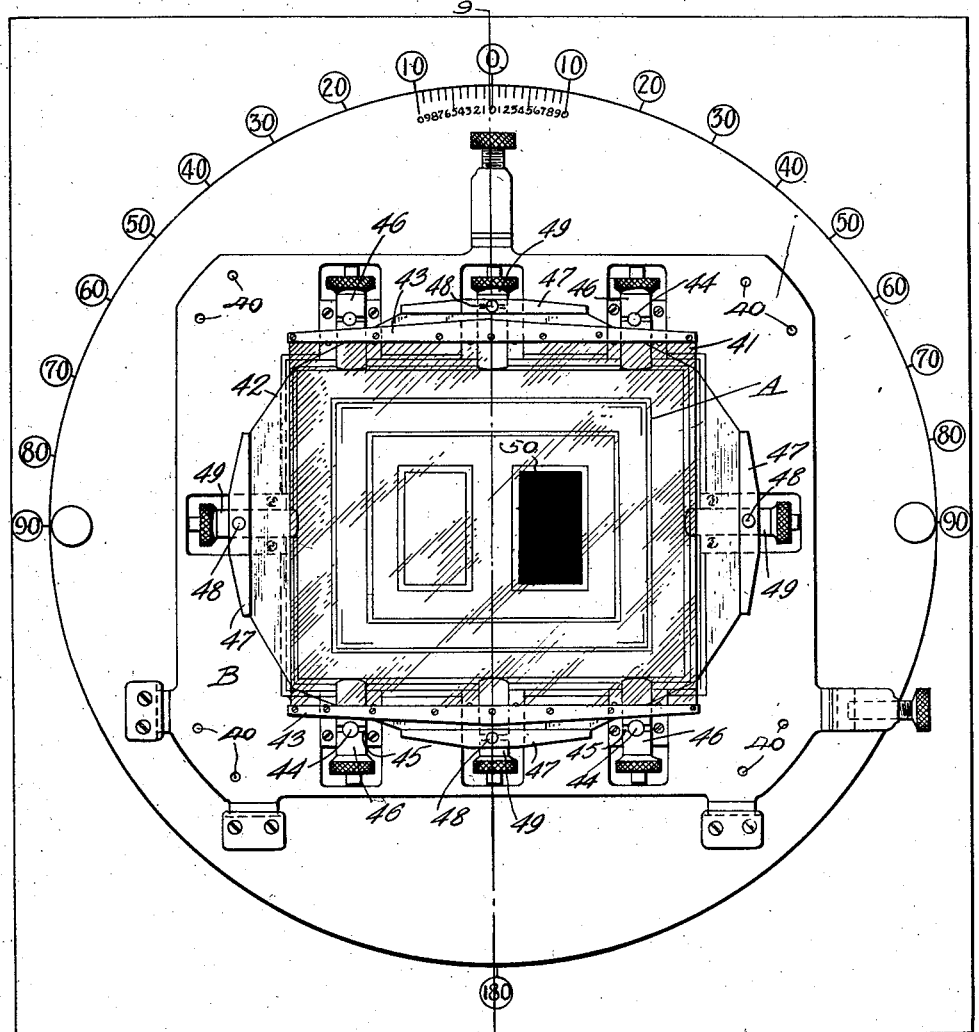
Fig. 8 is a view similar to Fig. 5, showing the holder provided with means for securing thereon a flexible printing plate or film, and masking means therefor.
Figure 9:
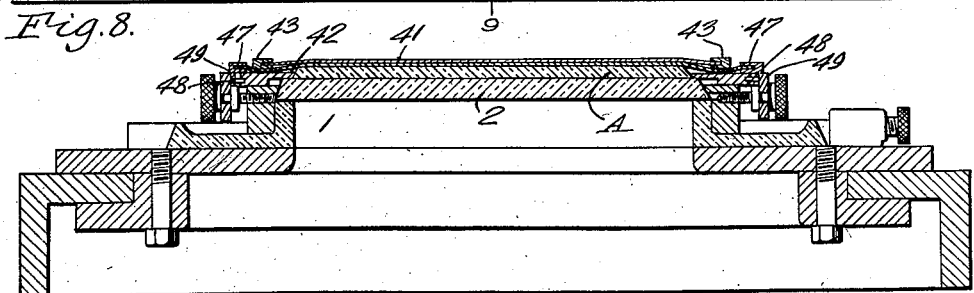
Fig. 9 is a sectional elevation on line 9—9, Fig. 8.

Figs. 8 and 9 show the printing plate holder equipped with means for securing a thin, flexible, transparent printing plate or film 41, and masking film or sheet 42 over the glass or rigid plate A. As shown, the transparent printing film 41 has secured to two opposite edges, parallel attaching bars 43, each provided with a pair of headed studs 44, adapted to enter undercut transverse slots 45 in the screw-operated securing blocks 46 for the glass plate A. By slipping the studs 44 into the slots of the securing blocks and moving these blocks by means of their operating screws, the thin film can be stretched taut over the face of the glass plate A. This transparent printing film is then backed and held from deflection by the glass plate A and can be used for making photographic prints on either a flexible or rigid, print-receiving plate or surface. The mask or cover film 42 is a thin, transparent film which extends over the face of the glass plate A between the same and the printing film 41. This mask film is stretched and secured on the holder in a manner similar to the printing film by attaching bars 47 secured to the four edges of the mask film and provided with headed studs 48 adapted to be engaged in transverse, undercut slots in the securing block 49 arranged at the four edges of the glass printing plate. The mask film is stretched taut by moving these securing blocks 49 by means of their screws in the same manner that the printing film is stretched and secured. The mask or cover film is provided with an opaque portion or coating, indicated at 50, which can be located so as to cover or blank out any desired portion of the printing film. The light cannot pass through this opaque portion so that only the portions of the image or images which are not covered by the opaque coating will be printed. Since the mask or cover film underlies the printing film throughout the entire area of the glass or rigid plate A, the outer surface of the printing film will occupy the same plane throughout and can be placed in perfect contact throughout its entire printing area with a glass or rigid print-receiving surface, thus insuring a perfect print on such a glass or rigid print-receiving surface. Perfect prints can, therefore, be made on glass plates or other rigid print-receiving surfaces which would not be possible if mask strips or pieces were used which covered only a portion of the printing film because such strips or pieces would prevent an intimate contact of portions of the printing and print-receiving surfaces, thus leaving a space which would permit leakage of light sufficient to make an imperfect print.

It is intended to use the holders and masks described in photographic contact printing and projecting composing apparatus as well as other apparatus used in connection with photographic plate production.

I claim as my invention:

1. The combination of a printing plate holder having a transparent supporting plate secured thereon, and means for securing a transparent printing plate on said supporting plate, said supporting plate having an opaque border which extends to the edges of said printing plate to prevent the leakage of light around the printing plate.

2. The combination of a printing plate holder having a transparent supporting plate secured thereon, and means for securing a transparent printing plate on said supporting plate, the marginal portions of said supporting plate which extend beyond the edges of the printing plate having thereon an opaque coating to prevent a leakage of light through said marginal portions.

3. The combination of a printing plate holder provided with a transparent supporting plate, and means for securing a transparent printing plate on said supporting plate, the marginal portions of said supporting and printing plates being covered by meeting opaque coatings to prevent the leakage of light through said marginal portions.

4. The combination of a printing plate holder having a light opening therethrough, means for securing a transparent printing plate on said holder in a position bridging said opening, a thin flexible mask arranged in masking relation to said printing plate to prevent the passage of light through a portion of said plate and enable printing from a portion only of the plate, and means for removably securing and stretching said mask on said plate holder.

5. The combination of a printing plate holder having a light opening therethrough, means for securing a transparent printing plate on said holder in a position bridging said opening, a thin flexible mask arranged in masking relation to said printing plate to prevent the passage of light through a portion of said plate and enable printing from a portion only of the plate, and attaching devices for said mask constructed to draw the mask taut on the holder and detachably secured to said plate holder whereby the mask and attaching devices can be secured on and removed from said plate holder.

6. The combination of a holder having a light opening therethrough and provided with means for securing a rigid transparent plate on said holder in a position bridging said opening, a flexible transparent printing plate overlying said rigid plate, a transparent mask located between said flexible and rigid plates and having an opaque portion which prevents passage of light through the overlying portion of the printing plate, and means for securing said flexible plate and mask in place.

7. The combination of a transparent supporting plate, a flexible transparent printing plate overlying said supporting plate, a transparent mask overlying said supporting plate between the same and said flexible printing plate and backing said flexible plate throughout its operative portion, said mask having an opaque portion which prevents passage of light through the overlying portion of said printing plate, and means for securing said printing plate and mask in position over said supporting plate.

8. The combination of a holder having a light opening therethrough and provided with means for securing a rigid transparent plate on said holder in a position bridging said opening, a flexible transparent printing plate overlying said rigid plate, a transparent mask located between said flexible and rigid plates and having an opaque portion which prevents passage of light through the overlying portion of the printing plate, and means for removably securing and stretching said flexible plate and mask on said holder.

9. The combination of a printing plate holder having a light opening therethrough, means for securing a transparent printing plate on said holder in a position bridging said opening, a thin mask arranged in masking relation to said printing plate to prevent the passage of light through a portion of said plate and enable printing from a portion only of said plate, and attaching devices for securing said mask on said holder, said printing plate securing means and said mask attaching devices being arranged below the outer faces of said plate and mask.

10. The combination of a printing plate holder having a light opening therethrough, means on said holder for securing a transparent printing plate thereon in a position bridging said opening, a thin mask arranged in masking relation to said printing plate to prevent the passage of light through a portion of said plate and enable printing from a portion only of said plate, and attaching devices on said holder for securing said mask thereon, said printing plate securing means and said mask attaching devices being arranged on said holder below the outer faces of said plate and mask.

11. The combination of a holder having an opening therethrough and provided with means for securing a rigid transparent plate on said holder in a position bridging said opening, a flexible transparent printing plate overlying said rigid plate, a transparent mask located between said flexible and rigid plates and having an opaque portion which prevents passage of light through the overlying portion of the printing plate, and means on said holder for securing said flexible plate and mask in place, said securing means being arranged below the printing surface of said flexible plate.

WILLIAM C. HUEBNER.